March 4, 1930.  H. G. ELLIS  1,748,977
LASTING JACK
Filed Jan. 21, 1929
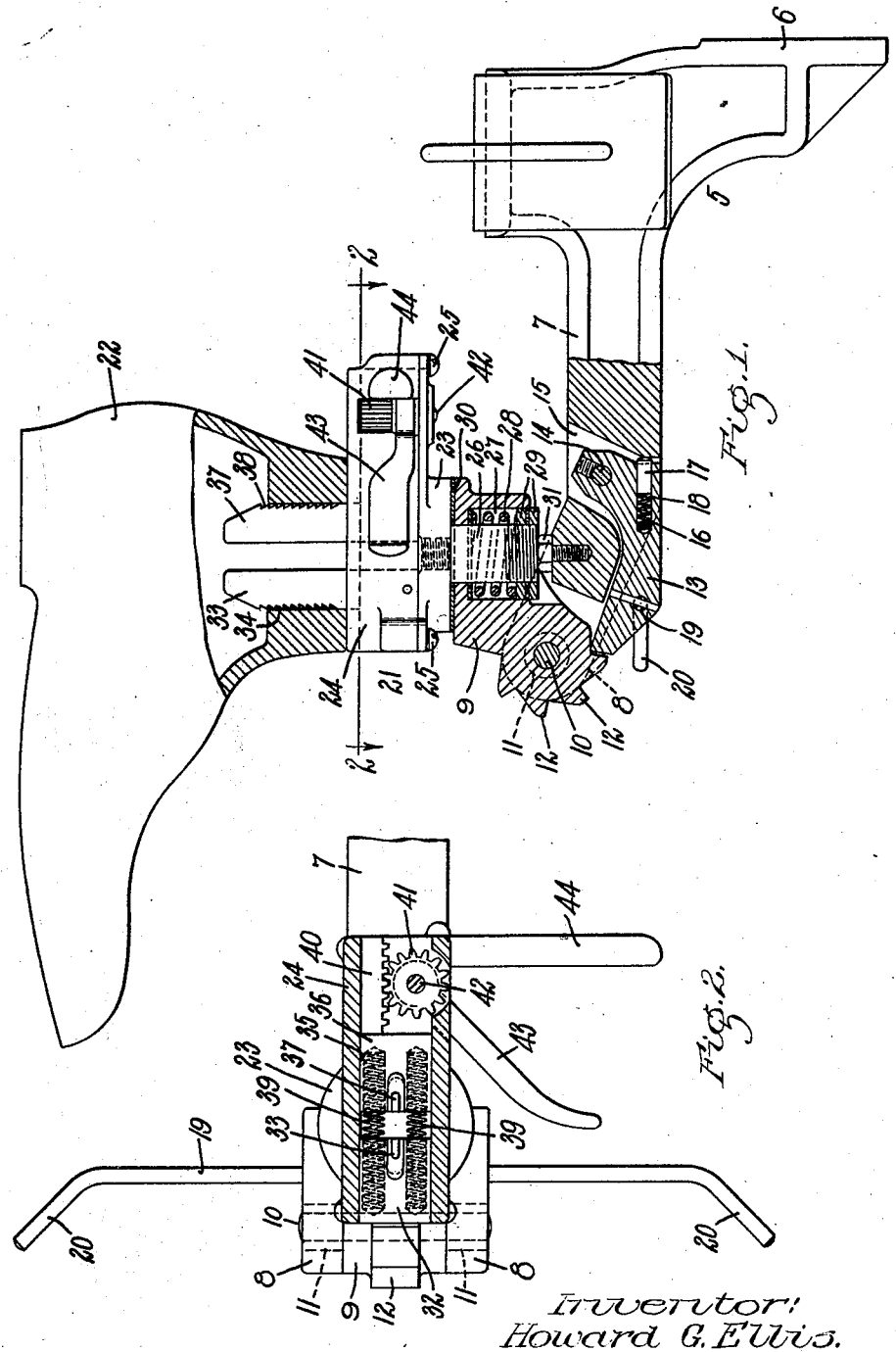
Inventor:
Howard G. Ellis.
by
Atty.

Patented Mar. 4, 1930

1,748,977

UNITED STATES PATENT OFFICE

HOWARD G. ELLIS, OF WALTHAM, MASSACHUSETTS, ASSIGNOR, BY MESNE ASSIGNMENTS, TO HOOD RUBBER COMPANY, INC., OF WATERTOWN, MASSACHUSETTS, A CORPORATION OF DELAWARE

LASTING JACK

Application filed January 21, 1929. Serial No. 333,798.

This invention relates to improvements in lasting jacks, and has for its object to provide a jack which will firmly grip the last and which can be quickly and easily manipulated by the operator to occupy the different positions necessary in order that a shoe under construction may be operated upon in a convenient manner and with a minimum amount of effort from the operator.

The invention consists in a lasting jack or holder for a last as set forth in the following specification and particularly as pointed out in the claims.

Referring to the drawings:

Figure 1 is a side elevation of the lasting jack showing a last positioned thereon, portions of the jack and last being broken away and illustrated in section.

Fig. 2 is a plan section taken on the line 2—2 of Fig. 1.

Like numerals refer to like parts throughout the several views of the drawings.

In the drawings, 5 is a bracket having a portion 6 which is adapted to be secured to a suitable support, preferably a movable conveyor mechanism. The bracket 5 embodies therein an arm 7, the outer end portion of which is divided to form furcations 8 between which a connecting member 9 is mounted upon a pivotal pin 10 constituting a horizontal axis, which is supported in bushings 11 which are in turn mounted in the furcations 8. The connecting member 9 has a plurality of ratchet teeth 12 formed integral therewith and positioned concentric to the axis of the pivotal pin 10 and said teeth are engaged by a pawl 13 pivotally mounted at 14 in a slot 15 provided in the arm 7.

The pawl 13 is normally held in engagement with the teeth 12 by a spring 16 which engages one end of a pin 17, said pin and spring being mounted in a recess 18 provided in the pawl 13 and the other end of said pin engaging a portion of the arm 7. The pawl 13 is manually actuated by means of a rod 19 which projects through said pawl and the opposite end portions of said rod extends a sufficient distance beyond the opposite sides of said pawl so that handle portions 20 formed at the opposite ends thereof may be easily engaged by the operator. The teeth 12 are so formed upon the connecting member 9 that the latter is permitted to rock through an arc of 180° upon the bracket 5, and the last 22 may be moved from the inverted position illustrated in Fig. 1, at which time the toe portion of the last is pointing forwardly and the bottom of the last is facing upwardly, to a position where the last is in an upright position with the toe pointing rearwardly and the bottom of the last facing downwardly.

Mounted upon the connecting member 9 is a holder 21 for a last 22, said holder embodying therein a casing consisting of a base member 23 which is rotatably mounted upon the connecting member and a body member 24 which is secured by screws 25 to the base member 23. The base member 23 has a stud 26 rigidly secured thereto which projects from said base member through the connecting member 9 and through a recess 27 provided in said connecting member, and a spring 28 is located within the recess 27 and surrounds the stud 26, being held under compression within said recess by means of nuts 29 which have screw-threaded engagement with the stud 26. A friction washer 30 is interposed between the surfaces of the base member 23 and connecting member 9 and the ease with which the last holder 21 may be rotated upon the connecting member 9 is increased or diminished by increasing or diminishing the tension upon the spring 28 by manipulating the nuts 29.

A stop screw 31 is mounted in the arm portion 7 of the bracket 5 and when the last holder is located in its uppermost position, the extremity of the stud 26 rests upon the head of said screw.

Rigidly secured in any suitable manner in the last holder 21 is a block 32 having a rigid or stationary jaw portion 33 projecting upwardly therefrom and provided with a plurality of teeth 34. Slidably mounted within the last holder 21 between ways 35 formed upon the body member 24 of said last holder is a slide 36 having a jaw 37 projecting upwardly therefrom parallel to the jaw 33 and provided with a plurality of teeth 38. The jaw 37 constitutes a movable jaw of the jack and said jaw is normally forced away from the jaw 33, and the toothed portions of both jaws are held in yielding engagement with the last 22 by a pair of springs 39 which are interposed between the block 32 and the slide 36, the end portions of said springs being located in oppositely disposed recesses provided in the block 32 and slide 33.

Rigidly secured to the slide 36 is a rack 40 and the latter meshes with and is driven by a pinion 41 fast to a stud 42 which is mounted at its opposite ends in the base member 23 and body member 24. A handle 43 is rigidly fastened to the stud 42 and a handle 44 is formed integral with the body member 24, and in operating the jaws 33 and 37 in order that the last 22 may be either gripped thereby or disengaged therefrom, the handles 43 and 44 are grasped simultaneously and the handle 43 upon being moved toward the handle 44 will cause the slide 36 to be moved toward the block 32, thereby moving the jaw 37 toward the jaw 33, allowing the last to be attached to or removed from the holder 21.

The jack of this invention permits a last to be tipped to any position desired by the operator with very little exertion and all that is required to release the pawl 13 from the teeth 12 of the connecting member 9 is to lightly tap the rod 19 upon either end, preferably at the handle portion 20 thereof and the last 22 may be rocked from its uppermost to its lowermost positions in one movement or step by step as permitted by the pawl and ratchet mechanism. At the same time the last holder 21 with the last thereon may be rocked in the connecting member 9 upon the axis of the stud 26 to still further locate the last in positions where it will be most convenient for the operator to work upon the shoe.

In operating the movable jaw 37, the movement imparted to said jaw by the rack and pinion mechanism will always retain the jaws 33 and 37 in parallel relation to each other. The frictional resistance to displacement between the last holder 21 and connecting member 9 makes it possible to turn or rock the last holder into the different positions desired while presenting sufficient resistance to displacement to hold the last in the position to which it may have been turned by the operator.

I claim.

1. A last holder for a jack having, in combination, a rigid jaw, a movable jaw, means to yieldingly force said jaws apart, means to hold said jaws in parallel relation to each other, and means to force said jaws toward each other.

2. A last holder for a jack having, in combination, a rigid jaw, a movable jaw, springs to force said jaws apart, and manually actuated means to impart a sliding movement to said movable jaw to force the same toward said rigid jaw.

3. A last holder for a jack having, in combination, a stationary jaw, a movable jaw, means to force said jaws apart and into engagement with a last, a rack fast to said movable jaw, and a toothed member meshing with said rack and adapted to actuate the same.

4. A last holder for a jack having, in combination, a stationary jaw, a movable jaw, means to force said paws apart and into engagement with a last, a rack fast to said movable jaw, a gear meshing with said rack and means to impart a rotary movement to said gear.

5. A last holder for a jack having, in combination, a stationary jaw, a movable jaw, means to force said jaws apart and into engagement with a last, a rack fast to said movable jaw, a gear meshing with said rack, and a handle fast to said gear.

6. A last holder for a jack having, in combination, a casing, a handle portion for said casing, a rigid jaw upon said casing, a movable jaw slidably mounted upon said casing, means to force said jaws apart, a rack fast to said movable jaw, a gear meshing with said rack and a handle fast to said gear and co-operating with said first-mentioned handle to actuate said gear.

7. A jack for a last having, in combination, a bracket, a connecting member pivotally attached to said bracket, a ratchet for said connecting member, a pawl for said ratchet, and a last holder rotatably mounted upon the connecting member.

8. A jack for a last having, in combination, a bracket, a connecting member pivotally attached to said bracket, a plurality of teeth upon said connecting member and positioned concentric to the axis thereof, a pawl engaging said teeth, and a last holder rotatably mounted upon the connecting member.

9. A jack for a last having, in combination, a bracket, a connecting member pivotally attached to said bracket, a ratchet for said connecting member, a pawl for said ratchet, a last holder rotatably mounted upon the connecting member, and means to vary the resistance to rotation between the last holder and connecting member.

10. A jack for a last having, in combination, a bracket, a connecting member pivotally attached to said bracket, a plurality of teeth upon said connecting member and positioned concentric to the axis thereof, a pawl engaging said teeth, a last holder upon the connecting member, a stud fast to said last holder and rotatably mounted in the connecting member, a spring encircling said stud and seated against the connecting member, and means to vary the tension upon said spring and thereby vary the resistance to rotation between the last holder and connecting member.

11. A jack for a last having, in combination, a bracket, a connecting member rotatable on said bracket about a horizontal axis, a ratchet for said connecting member, a pawl for said ratchet, a last holder rotatable on said connecting member and embodying therein a pair of jaws oppositely disposed to each other, yielding means to force said jaws apart, and means to impart a sliding movement to one of said jaws to force the same toward the other jaw.

In testimony whereof I have hereunto set my hand.

HOWARD G. ELLIS.